(12) United States Patent
Hamilton et al.

(10) Patent No.: US 6,858,285 B1
(45) Date of Patent: Feb. 22, 2005

(54) HIGH BOND STRENGTH, REPOSITIONABLE ADHERENT SHEET

(75) Inventors: Peter Worthington Hamilton, Cincinnati, OH (US); Kenneth S. McGuire, Wyoming, OH (US); James Edward Poland, Park Hills, KY (US); Andrew L. Bouthilet, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/532,576

(22) Filed: Mar. 22, 2000

(51) Int. Cl.⁷ .................................................. B32B 3/00
(52) U.S. Cl. ........................ 428/174; 428/156; 428/167; 428/172; 428/173; 428/343; 428/354
(58) Field of Search ................................ 428/156, 167, 428/172, 173, 174, 343, 354

(56) References Cited

U.S. PATENT DOCUMENTS

| | | | |
|---|---|---|---|
| 2,338,749 A | 1/1944 | Wilbur | 24/67 |
| 4,889,234 A * | 12/1989 | Sorensen et al. | 206/459.5 |
| 4,959,265 A | 9/1990 | Wood et al. | 428/343 |
| 5,344,693 A | 9/1994 | Sanders | 428/167 |
| 5,453,296 A | 9/1995 | Lauritzen et al. | 427/208.6 |
| 5,487,929 A | 1/1996 | Rusincovitch, Jr. et al. | 428/40 |
| 5,662,758 A * | 9/1997 | Hamilton et al. | 156/221 |
| 5,795,636 A | 8/1998 | Keller et al. | 428/40.1 |
| 5,866,220 A | 2/1999 | Rusincovitch et al. | 428/40.1 |
| 5,871,607 A * | 2/1999 | Hamilton et al. | 156/221 |
| 5,906,883 A * | 5/1999 | Blanc-Brude | 428/178 |
| 5,965,235 A | 10/1999 | McGuire et al. | 428/156 |
| 5,968,633 A * | 10/1999 | Hamilton et al. | 428/174 |
| 6,193,918 B1 | 2/2001 | McGuire et al. | 264/167 |
| 6,194,062 B1 | 2/2001 | Hamilton et al. | 428/343 |

FOREIGN PATENT DOCUMENTS

| | | |
|---|---|---|
| EP | 0708162 A2 | 4/1996 |
| JP | 61-115981 | 6/1986 |
| JP | 07-246216 | 9/1995 |

* cited by examiner

*Primary Examiner*—Harold Pyon
*Assistant Examiner*—Alicia Chevalier
(74) *Attorney, Agent, or Firm*—Peter D. Meyer

(57) ABSTRACT

An adherent sheet material and method of making including at least one adhesive, non-raised region protected from inadvertent adherence to a contact surface. This adherent sheet material also including a film having a front face and back face, wherein the front face has a plurality of collapsible, non-adhesive protrusions extending outwardly from the front face and adhesive, non-raised region disposed between the protrusions. Also, a substrate is bonded to the back face of film. An adherent sheet material including a contact adhesive protected from inadvertent adherence to a contact surface. This adherent sheet material also including a film having a front face and back face, wherein the front face has a plurality of collapsible, non-adhesive protrusions extending outwardly from the front face and adhesive, non-raised region disposed between the protrusions. The film also includes a number density of protrusions from about 50 protrusions per square inch of the film to about 150 protrusions per square inch of the film. Also, the contact adhesive is disposed upon non-raised regions.

46 Claims, 6 Drawing Sheets

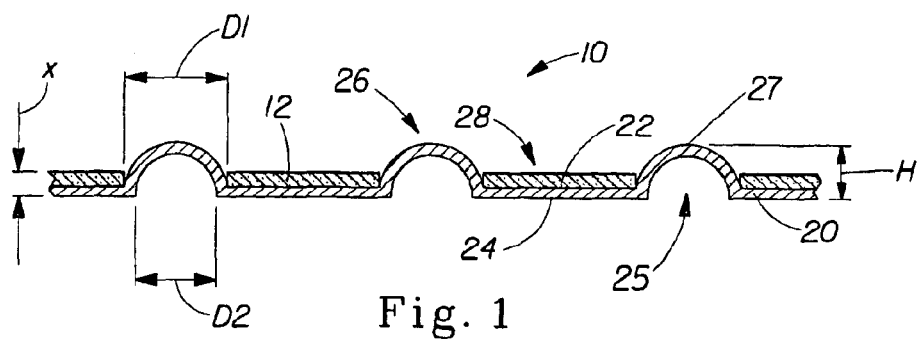
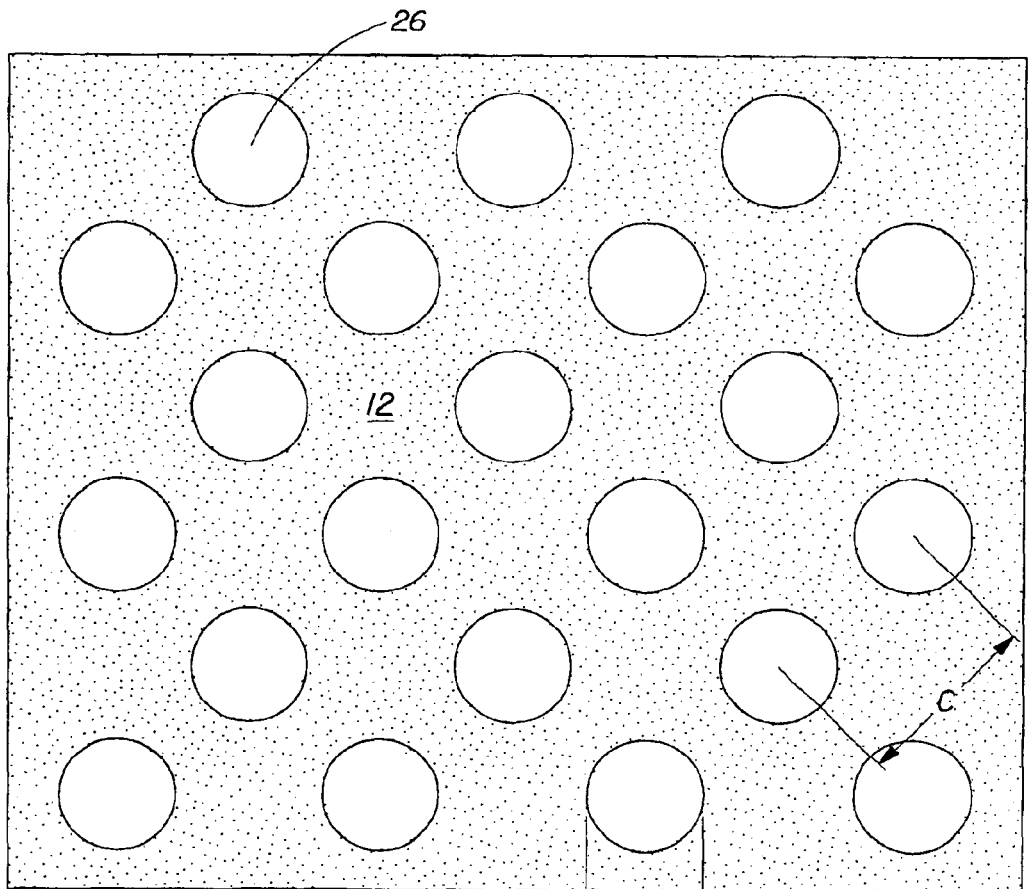

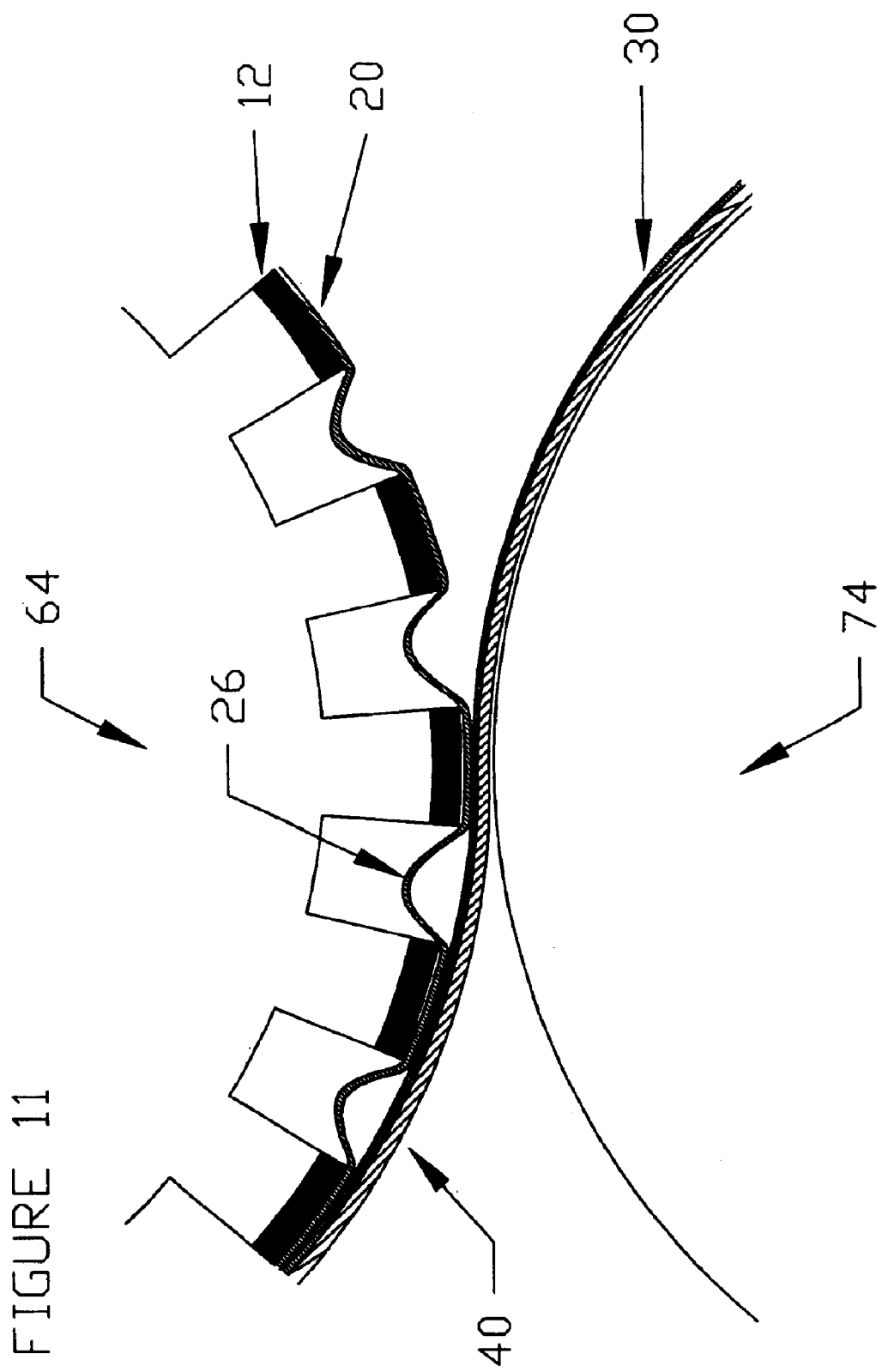

HIGH BOND STRENGTH, REPOSITIONABLE ADHERENT SHEET

FIELD OF THE INVENTION

The present invention relates to flexible sheet materials having an adhesive for providing a high bond strength and having outermost surface features for preventing premature adhesion to an contact surface such as a target surface. Even more particularly, the present invention relates to repositionable wall covering, tapes, labels, etc. comprising a flexible film having protrusions that act to space an adhesive from a target surface until the wall covering is pressed thereagainst.

BACKGROUND OF THE INVENTION

Decorative sheet-like materials, such as wall coverings are well known in the art. Such sheet materials are generally formed of paper, plastic, metal foil, fabric material or some combination thereof having a pattern or design printed or embossed on the front surface, with the back surface being coated by the user with an adhesive, such as glue, cement, or the like (generally known as "wallpaper paste") by which the wall covering may be bonded to a wall, ceiling or other target surface.

Other types of wall coverings include those having a plastic decorative surface and a backing of woven or non-woven fabric or paper. The back surface is adapted to be coated by the user with the adhesive set forth above in order to secure the wall covering to a surface. However, users dislike the inconvenience of mixing and applying the paste. Additionally, there are prepasted wall coverings available. However, these prepasted wall coverings need a water trough and this can be both time consuming and messy. Also, both the non-prepasted and prepasted wall coverings require the user to perform additional steps to apply the wall covering to the target surface. Generally, once these conventional wall coverings are applied to the target surface, only slight adjustments in their position upon the target surface may be made before the adhesive cures.

To eliminate the additional steps and mess of using "wallpaper paste", wall coverings have attempted to use pressure sensitive adhesives. Pressure sensitive adhesives are known to provide immediate adhesion between two materials upon contact. Such adhesives rely on quick set-up reaction or rapid cure time for prompt adhesion. In the art of tapes, labels, wall coverings and other articles using pressure sensitive adhesives to adhere an adhesive coated surface to a target surface, there has been recognized the problem of premature adhesion or sticking to contact surfaces, such as a target surface. That is, before the adhesive coated surface can be properly positioned over a target surface, inadvertent contact of the adhesive with the target surface causes premature adhesion at one or more locations, thereby inhibiting proper positioning. For example, due to this premature sticking to the target surface, wall coverings are very difficult to apply to a wall and then reposition, as occurs when lining up the patterns of at least two wall covering sheets.

To reduce this premature adhesion to contact surfaces, pressure sensitive adhesive wall coverings have typically used adhesives with a low bond strength or tack to attach it to the target surface. However, this creates an additional problem in that the wall coverings lack sufficient tack to maintain attachment to the target surface for long periods of time. Because of this low tack, over a period of time the user experiences the wall covering peeling from the wall especially at the sheet margins.

However, pressure sensitive adhesives ("PSA") with a higher bond strength or tack, i.e., aggressive or permanent pressure sensitive adhesives, generally have not been used to combat the problem of insufficient tack. This is due to the fact that these permanent PSA's are very tacky and tenacious and thus become very difficult to handle and use. For example, the wall covering will prematurely adhere to contact surfaces, such as the user's hands or the target surface. Once the adhesive has made premature contact with the surface, the user generally cannot remove the wall covering or even make slight adjustments in its position without destroying the wall covering or significantly reducing the bond strength. Therefore, most PSA wall coverings use low tack PSA's in an attempt to make the wall coverings easy to use. However, as mentioned above, even these low tack PSA's can cause the problem of premature adhesion to a contact surface. Although the user can generally separate the low bond strength wall covering from the contact surface without destroying the wall covering, it still frustrates the user and wastes the user's time.

Others have tried to solve the problem of premature adhesion to contact surfaces by applying a removable release paper to the adherent sheet material such as found for example in U.S. Pat. No. 5,487,929 issued to Rusincovitch, Jr. et al. on Jan. 30, 1996. However, this release paper adds additional costs to the sheet material and requires both the manufacturer and user to perform additional steps. Others have also tried to solve the specific problem of premature adhesion of a adherent, decorative sheet material by placing solid protrusions as spacers between the decorative sheet and the target surface such as also found in U.S. Pat. No. 5,487,929, issued Jan. 30, 1996, to Rusincovitch, Jr. et al. However, these protrusions are solid and thus require more material and do not completely collapse.

Still others have tried to solve the problem of premature adhesion of an adherent sheet material to contact surfaces by placing spacers to separate the pressure sensitive adhesive from the target surface, such as found, for example, in U.S. Pat. No. 4,376,440 to Whitehead et al., U.S. Pat. No. 5,141,790 to Calhoun et al., U.S. Pat. No. 4,959,265 to Wood et al., U.S. Pat. No. 5,344,693 to Sanders, U.S. Pat. No. 4,061,820 to Magid et al., and European Patent Application No. 0 623 332 A1 to Lauritzen. Generally, this art has focused on the use of stand-offs with pressure sensitive adhesives primarily in the area of sanitary napkins. However, different solutions are needed for flexible, adherent sheet materials having protrusions intended to be adhered to smooth or rigid surfaces. Commonly assigned, U.S. Pat. No. 5,662,758 issued to Hamiltion et al. on Sep. 2, 1997, and U.S. Pat. No. 5,871,607 issued to Hamilton et al. on Feb. 16, 1999, provide a thorough description of the art in adherent sheets protected from premature adhesion and are herein incorporated by reference.

Both of these commonly assigned patents involve adherent sheets which are protected from premature adhesion to a contact surface via hollow protrusions. However, generally, neither deal with wall coverings, labels or other adherent sheet materials having protrusions with either an additional substrate or a high bond strength.

It is well known in the art to bond a substrate to a flat film such as by laminating the two together using pressure and a laminating adhesive. However, if the film is formed with hollow protrusions then a problem exists in how to combine the substrate with the film that has hollow protrusions without crushing the film protrusions. Additionally, once the substrate is bonded to the film, an additional problem of air entrapment within the protrusions is created. For example, the substrate and potentially the laminating adhesive may now have created a gas barrier that prevents air from escaping from the protrusions when the protrusions are made to collapse. If the air does not escape from the protrusion, the protrusion may not fully collapse and thus prevent full adhesion of the sheet material to the target surface.

U.S. Pat. No. 5,906,883, issued May 25, 1999, to Blanc-Brude, discusses plurality of interconnected non-adherent elements made from a substrate. However, it is believed that this requires a difficult process to make.

Therefore, such adherent sheet materials leave room for improvement in ease of use and manufacture, cost, repositionability and bond strength.

Accordingly, it would be desirable to provide an improved multi-layered, adherent sheet material which is inexpensive to make, has means for protecting the adhesive from prematurely adhering to contact surfaces yet is efficient to store and ship.

It would also be desirable to provide such a material which is easily handled and manipulated by a user during the application process and is repositionable, yet forms an adequate bond with a variety of materials and surfaces to effectively adhere to the target surface.

It would also be desirable to provide a wall covering which is easily handled and manipulated by a user during the application process and is repositionable, yet forms an adequate bond against a variety of materials and surfaces to effectively adhere to the target surface.

SUMMARY OF THE INVENTION

An adherent sheet material including at least one adhesive, non-raised region protected from inadvertent adherence to a contact surface. This adherent sheet material also including a film having a front face and back face, wherein the front face has a plurality of collapsible, non-adhesive protrusions extending outwardly from the front face and adhesive, non-raised region disposed between the protrusions. Also, a substrate is bonded to the back face of film.

An adherent sheet material including at least one adhesive, non-raised region protected from inadvertent adherence to a contact surface. This adherent sheet material also including a film having a front face and back face, wherein the front face has a plurality of collapsible, non-adhesive protrusions extending outwardly from the front face and adhesive, non-raised region disposed between the protrusions. The film also includes a number density of protrusions from about 10 protrusions per square inch of the film to about 175 protrusions per square inch of the film. The adherent sheet material has a peel force of at least about 0.3 pounds per linear inch.

An adherent sheet material including a contact adhesive protected from inadvertent adherence to a contact surface. This adherent sheet material also including a film having a front face and back face, wherein the front face has a plurality of collapsible, non-adhesive protrusions extending outwardly from the front face and adhesive, non-raised region disposed between the protrusions. The film also includes a number density of protrusions from about 50 protrusions per square inch of the film to about 150 protrusions per square inch of the film. Also, the contact adhesive is disposed upon said non-raised regions.

Also included in the present invention is a method for making an adherent sheet material having a film with protrusions, a contact adhesive protected from inadvertent adherence and a substrate bonded to the film. The sheet being adherable to a target surface only when pressed thereagainst. The method includes coating a forming drum with a contact adhesive. The forming drum has a top surface, wherein this surface has a plurality of recesses therein. This coating step applies the contact adhesive to the top surface without bridging the recesses. The next step in the method is placing a piece of flexible film in contact with the contact adhesive on the top surface of the forming drum. The contact adhesive will preferentially adhere to the piece of flexible film. Then, a piece of flexible film is formed to create a plurality of protrusions extending into the recesses of the forming drum. The plurality of protrusions being registered with the contact adhesive. Also, a substrate is coated with a laminating adhesive and placed in contact with a back face of the film. After this step, the substrate and the film are joined with pressure to form a bonded layer. Finally, the piece of sheet material is removed together with the pressure sensitive adhesive from the forming drum.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

FIG. 1 is a cross-sectional view of a adherent sheet material embodiment of the present invention;

FIG. 2 is a top planar view of the adherent sheet material shown in FIG. 1;

FIG. 11 is a side elevation view of the pressure drum and the female embossing drum, wherein the substrate is bonded to the formed film having protrusions of the present invention.

DETAILED DESCRIPTION OF THE INVENTION

Figure 3:
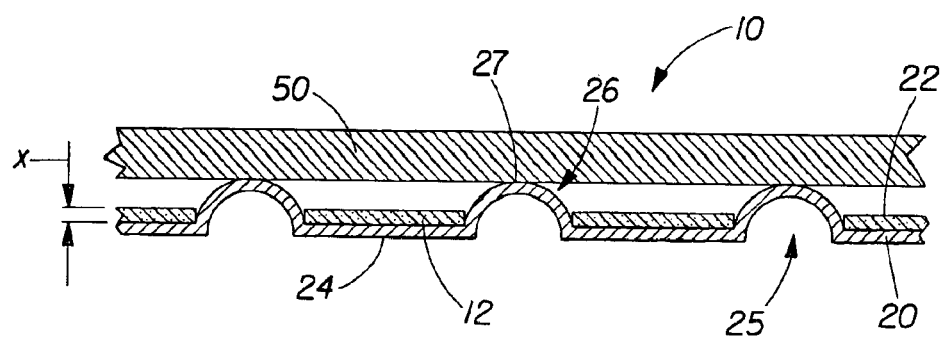
FIG. 3 is a cross-sectional view of a adherent sheet material shown in FIG. 1 in contact with a contact surface.

Referring now to the drawings, and more particularly to FIGS. 1–8, there is shown a preferred embodiment of the present invention, which provides the adherent sheet material and is generally indicated as 10. As shown in FIG. 1 (cross-sectional view), adherent sheet material 10 includes a piece of a flexible film sheet 20 having an operational front face 22, a back face 24, non-adhesive, three-dimensional protrusions 26 extending outwardly from the front face 22 and adhesive, non-raised regions 28 located between the protrusions 26.

Sheet material 10 is a selectively-activatible, adhesive-bearing structure which bonds sheet material 10 to a target surface. The target surface for the adhesive system includes but is not limited to walls, table tops, shelves, etc.

As utilized herein, the term "selectively-activatible" is used to refer to materials which exhibit substantially non-adherent properties when brought into contact with target surfaces until some action is taken by a user to "activate" the material to reveal adhesive properties. Accordingly, selectively-activatible properties differ from permanently-active strips of adhesive which rely upon removal of liner materials (typically silicone-coated paper strips or films) to expose the adhesive for use.

Selective activation of such materials allows the user to properly position sheet material 10 upon a target surface before activation and adhesion are accomplished, as well as minimizing the likelihood of contamination of the adhesive system before use. This characteristic permits the sheet material 10 to be manipulated in any desired mode without encountering the difficulties of premature adhering of the adherent sheet to itself or to other contact surface 50s, and without the need for separate release sheets, liners, microspheres or the like which often need to be removed prior to contact with the target surface. If desired, the selective activation process may be temporary, i.e., minimal contact between adherent, non-raised regions 28 and a contact surface 50 for evaluation of sheet material's 10 position upon target surface and then may be de-activated without destroying sheet material 10 for either removal of sheet material 10 from or repositioning it upon target surface 50 for further use without significant loss of adhesive capability.

Regardless of the manner of activation, materials useful as an adhesive system in accordance with the present invention will exhibit an adhesive, adherent or tacking character as opposed to merely a clinging or affinity character. As utilized herein, the terms "adhesive" is utilized to refer to the ability of a material to exhibit an adherent character whether or not it actually includes a composition commonly understood and labeled as an adhesive. Accordingly, such materials will form a bond or seal when in contact with itself or another target surface as opposed to merely being attracted to such surface. While a number of approaches such as the use of selectively adherent materials may be utilized to provide the desired adhesive properties, a presently preferred approach is to utilize a pressure sensitive adhesive.

When designing materials useful as an adhesive system in accordance with the present invention, it may be desirable to tailor the particular choice of adhesive material or agent so as to provide either a permanent bond or a releasable bond as desired for a particular application. In accordance with the preferred embodiment of the present invention, depending upon extent of the activation employed, the sheet 10 can demonstrate a releasable bond, i.e., a temporary bond, be either removed without destroying sheet material 10 or repositioned and then activated completely once placed in desired position upon target surface to form a permanent bond between sheet 10 and target surface.

Referring to FIGS. 1–3, sheet material 10 includes adhesive, non-raised regions 28 on film sheet 20 between and around protrusions 26. Adhesive, non-raised regions 28 have adhesive properties which can be achieved in a variety of different ways. One such way to provide non-raised regions 28 adhesive characteristics is to fabricate film sheet 20 from a material that demonstrates adhesive characteristics, including but not limited to plasticized polymers, i.e., polyvinyl chloride, silicones, hydrogels, polyvinylidene dichloride, Kraton Rubber, urethane polymers, plastisols, plasticized waxes, i.e., organic waxes (beeswax), inorganic waxes (paraffin), etc., gelatins and other organic based, proteinaceous materials.

Also, Commonly assigned, U.S. patent application Ser. No. 08/745,340, filed Nov. 8, 1996 in the name of Hamilton et al. describes materials that exhibit adhesive or "cling" properties and is herein incorporated by reference. As discussed above, such materials can exhibit adhesive or "cling" properties on a constant basis, such that they cling to themselves and to other surfaces whenever brought into proximity with them, whether desirable or not. Such materials often incorporate resins, additives, tackifiers, or other materials to achieve the target level of cling. Suitable methods of measuring and quantifying this cling property are described in ASTM test methods D5458-95 and D3354-89. Test method D5458-95 is useful for measuring cling between two layers of film in both stretched and unstretched conditions, and utilizes a 1 inch wide film strip adhered to a flat film attached to an inclined surface. The force required to remove the film strip from the flat film is measured. Test method D3354-89 is useful for measuring the degree of blocking (unwanted adhesion) existing between overlapping layers of plastic film. Film-to-film adhesion is expressed as a blocking load in grams which will cause two layers of film to separate with an area of contact of 100 square centimeters.

Another such way to provide the non-raised regions 28 adhesive characteristics is to fabricate film sheet 20 from materials with activated adhesive systems, including but not limited water activated adhesives, ultraviolet light activated systems, encapsulated adhesive, anaerobic, i.e., cyanoacrylates.

Again, referring to FIGS. 1–3, a third way to provide non-raised regions 28 of film sheet 20 with adhesive characteristics is to dispose upon or coat on a surface of non-raised regions 28, preferably a contact adhesive 12, including but not limited to a pressure sensitive adhesive ("PSA").

Generally, the pressure sensitive adhesive (PSA) useful in the invention can be any adhesive known to those skilled in the art, including but not limited to elastomeric-type PSAs comprising natural rubber, reclaimed rubber, styrene-isoprene-styrene rubber, butadiene-acrylonitrile rubber, polyvinyl ether rubber, styrene-butadiene-styrene rubber, butyl rubber, polyisobutylene rubber, nitrile rubber, styrene-butadiene rubber, polyurethane, polysulfide, polyesters, silicone resins and gums, neoprene rubber, acrylic, methacrylic, polyacrylate ester rubber, and vinyl and mixtures thereof.

Contact adhesive 12 is preferably a pressure sensitive adhesive, also preferably a hot melt adhesive, most preferably an adhesive of specification number X 801 334 03, made by Ato Findley Co. of Wauwatosa, Wis. Contact adhesive 12 may be refastenable, releaseable, permanent, or otherwise. The size, shape and spacing of protrusions 26 is preferably selected to provide a continuous contact adhesive 12 path surrounding protrusions 26 but is not necessary to practice the invention and thus a discontinuous adhesive path could be applied upon non-raised regions 28. Contact adhesive layer 12 has a thickness of X which is preferably from about 0.001 inches to 0.010 inches, most preferably 0.002 inches of pressure sensitive adhesive.

If film sheet 20 is fabricated from a material having adhesive properties in order to provide non-raised regions 28 an adhesive property, then protrusions 26 being made of the same material would need some type of non-adhesive coating ("cappers") to permit sheet material 10 to slide or be repositioned over contact surface 50. The cappers can be applied minimally over protrusion apex 27 of protrusions 26, preferably the entire surface of each of protrusions 26. These cappers demonstrate non-adhesive properties and include but are not limited to silicones, inorganic powders, i.e., talc, powdered mica, calcium carbonate, etc., inks and other non-tacky coatings well known in the art. These non-adhesive cappers, prevent the activation of film sheet's 20 adhesive properties, thus permitting repositionability and preventing premature adhesion to a contact surface 50 of sheet 10.

If film sheet 20 is fabricated from a material having adhesive properties that require an intentional activation to activate the adhesive properties of the material, then protrusions 26 do not require any type of non-adhesive, coating or cap. The user will selectively activate only the adhesive properties of adhesive, non-raised regions 28 and not the adhesive properties of non-adhesive, protrusions 26.

Still referring to FIGS. 1–3, film sheet 20 is preferably fabricated from a polymer that does not have adhesive characteristics, which may be made from homogeneous resins or blends thereof. Single or multiple layers within the film structure are contemplated, whether co-extruded, extrusion-coated, laminated or combined by other known means. Useful resins include, but are not limited to, polyethylene (PE), polypropylene (PP), polyethylene terephthalate (PET), polyvinyl chloride (PVC), polyvinylidene chloride (PVDC), latex structures, nylon, etc. Polyolefins are generally preferred due to their lower cost and ease of forming but are not necessary to practice the invention. High density polyethylene (HDPE) is most preferred to fabricate the film sheet. Other suitable materials to fabricate the film from include, but are not limited to, aluminum foil, coated (waxed, etc.) and uncoated paper, coated and uncoated wovens, scrims, meshes, nonwovens, and perforated or porous films, and combinations thereof. In a particularly preferred embodiment, the flexible film sheet material is a formed film from about 0.0001 inch to about 0.005 inches, more preferably about 0.001 inch thick film.

Protrusions 26 are discreet, collapsible three-dimensional outermost surface features formed from film sheet 20. Protrusions 26 extend outwardly from the front face 22 in a substantially perpendicular direction, occupying a voided space 25 under protrusions 26 (FIG. 1). Protrusions 26 have heights (H) which are preferably less than their diameters D1, so that when they collapse, they collapse along an axis which is substantially perpendicular to a plane of sheet 10. This mode of collapse avoids protrusions 26 folding over and blocking adhesive 12 from contact with a target surface 50. Commonly assigned, U.S. Pat. No. 5,662,758 issued to Hamiltion et al. on Sep. 2, 1997, and U.S. Pat. No. 5,871,607 issued to Hamilton et al. on Feb. 16, 1999, and commonly assigned, U.S. patent application Ser. No. 08/745,340, filed Nov. 8, 1996 in the name of Hamilton et al. and Ser. No. 09/369,743, filed Aug. 6, 1999 in the name of Hamilton et al. provide detailed information on adherent sheets having formed film sheets with protrusions and are herein incorporated by reference.

Figure 5:
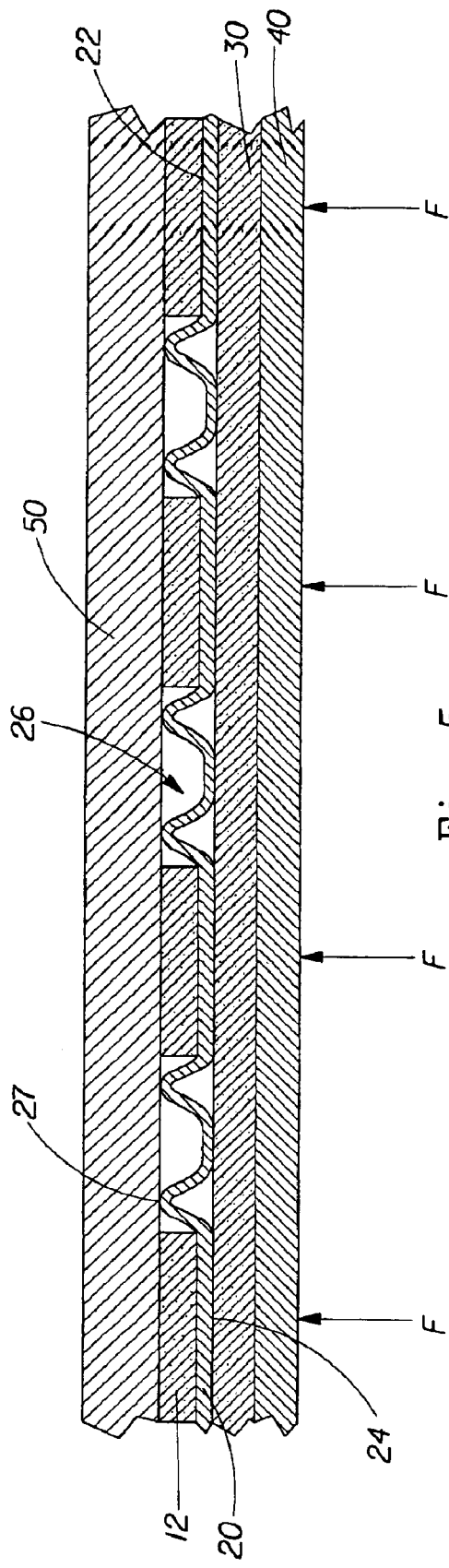
FIG. 5 is a cross-sectional view of a adherent sheet material shown in FIG. 4 in contact with a contact surface, wherein a force (F) has been applied to adherent sheet material causing protrusions to collapse.

Protrusions 26 are collapsible in that they are hollow protrusions that, once placed under a significant applied pressure, deform from a substantially three-dimensional structure (as shown in FIG. 1) to a substantially two-dimensionsal structure (as shown in FIG. 5). The term "discreet" is used herein to refer to the fact that film sheet 20 separates voided spaces 25 of each protrusion 26, i.e., protrusions 26 are not interconnected to any other individual protrusion 26. In other words, the air entrapped within the voided space 25 of one of protrusion 26 cannot travel to any of the other protrusions 26.

Protrusions 26 are preferably domed-shaped but can be a variety of shapes without changing the scope of the invention, such as conical, cylindrical, hemispherical, toroidal and pyramidal. Preferably, protrusions 26 have a protrusion apex 27 which is a point on protrusions 26 having the greatest perpendicular distance from the front face 22 of the film sheet 20.

The number density of protrusions 26, i.e., the number of protrusions per square inch, is an important parameter in the context of the present invention because it is one determination of the compressive strength of protrusions 26. The term "compressive strength" is used herein to refer to a perpendicularly applied force (F) a particular three-dimensional sheet can support for a given amount of sheet deflection. For this particular case, protrusion 26 deflection is analogous to sheet deflection. This information is important because it quantifies the perpendicularly applied force (F) required to deform a particular sheet to a given protrusion height H. Protrusion height (H) is defined as the perpendicular distance from the front face 22 of the film 20 to the protrusion apex 27. For example, from FIG. 1, if a thickness (X) of adhesive 12 is coated across the front face 22 of the film sheet 20 such that it fills the adhesive, non-raised regions 28 between protrusions 26, the force (F) could be determined that would deform the sheet 10 to the height (X) of the adhesive 12, thus exposing the adhesive 12 to the contact surface 50.

Compressive Strength Analytical Test Method

This test was used to determine the compressive strength of the film sheet 20 at different levels of protrusion 26 deformation.

A circular sample with a diameter of 0.8 inches was cut from the film sheet material. The circular sample was then placed on the lower, stationary platform of an INSTRON brand model 8511 compression tester (available from INSTRON Corporation, Caston, Mass.). The upper moveable platform of the compression tester was then lowered until it barely came in contact with the sheet's protrusions. The three-dimensional sample was then fully compressed into a substantially two-dimensional sheet at an upper platform rate of 0.05 pounds per second. The compression tester was operated by the INSTRON Plus 8500 display unit in load control running from 0 to 10 pounds. Displacement of the upper platform and compressive load were measured and recorded throughout the test on an oscilloscope.

Based upon this test method, the present invention had a compressive strength of at least about 0.1 pound per square inch, preferably of at least about 1 pound per square inch, more preferably from about 0.5 pounds per square inch to about 15 pounds per square inch, even more preferably from about 3 pounds per square inch to about 10 pounds per square inch before contacting adhesive, non-raised regions 28, preferably contact adhsive 12.

Referring to FIGS. 1 and 2, the protrusions 26 have a protrusion height (H) preferably from about 0.01 inches to about 0.1 inches, more preferably 0.015 inches to about 0.040 inches, even more preferably 0.20, most preferably 0.025 inches and a base surface area from about 0.001 square inches to about 0.0065 square inches, most preferably 0.004 square inches. In the preferred embodiment, the base surface area (SA) is calculated by the formula of $SA = \frac{1}{4}\pi (D1)^2$. In a even more preferred embodiment, protrusions 26 have a base diameter (D1) from about 0.030 inches to about 0.10 inches, more preferably from about 0.040 inches to about 0.09 inches, most preferably 0.070 inches. Center-to-center spacing (C) of protrusions 26 can be randomly spaced using the method described in commonly assigned, U.S. Pat. No. 5,965,235, issued to McGuire et al. on Oct. 12, 1999, and herein incorporated by reference. FIG. 2 shows a preferred embodiment in which center-to-center spacing (C) is uniformly spaced, more preferably from about 0.05 inches to about 0.15 inches, even more preferably from about 0.07 inches to about 0.115, most preferably 0.105 inches.

Figure 4:
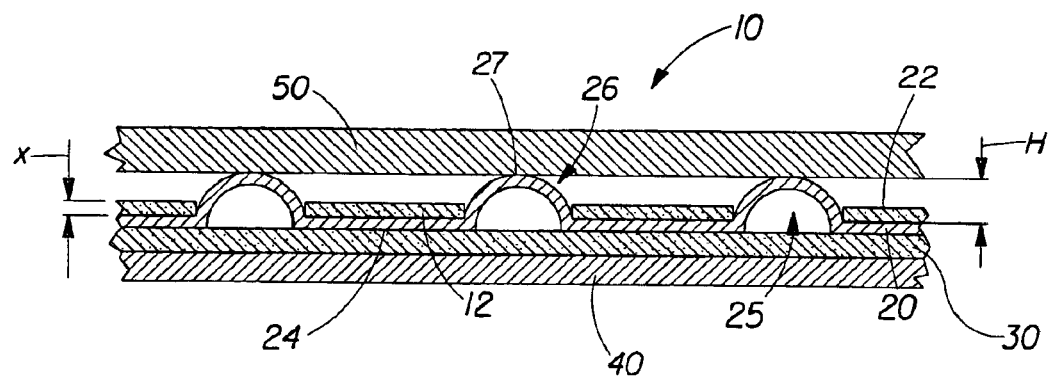
FIG. 4 is a cross-sectional view of a preferred adherent sheet material embodiment in contact with a contact surface.

FIGS. 3 and 4 show a contact surface 50, which may be smooth and rigid and is typically non-deformable, being spaced away from layer of contact adhesive 12 by protrusions 26. Contact surface 50 is defined as a surface generally parallel to front face 22 of film sheet 20 which contacts the protrusions 26 preferably at their protrusion apex 27. Contact surface 50 can be a variety of surfaces which sheet material's 10 adhesive layer 12 could come in contact with, such as a user's hand, drum, rollers, the sheet material itself and target surfaces such as walls, table tops, shelves, windows, etc.

Film protrusions 26 prevent the contact adhesive 12 from contacting any contact surfaces until the film 20 is intentionally pressed against desired contact surface 50, i.e. target surface 50. The adherent sheet material 10 is applied to contact surface 50 wherein the film protrusions 26 make contact with contact surface 50 and thus protect the contact adhesive 12 from contacting contact surface 50. The protrusions 26 prevent the premature adhesion of the adherent sheet 10, such as a wall covering, from prematurely adhering to the contact surface 50. This also permits the user to position sheet material 10 upon target surface 50 and then reposition, i.e., slide, sheet 10 to another position numerous times without destroying sheet material 10 or substantially reducing contact adhesive's 12 tack.

In particular, FIG. 4 shows a preferred embodiment of adherent sheet material 10 further consisting of a substrate 40 bonded to back face 24 of film sheet 20. This substrate 40 may be bonded to the back face 24 of the film sheet 20 by any type and method that suits the needs of the application. For example, they may be bonded together by way of heat-sealing, ultrasonic welding, preferably a laminating adhesive 30, including but not limited to slot coating and spray coating, , etc., most preferably spray coating.

Especially useful but not necessary for this lamination is a tacky PSA, including but not limited to all the PSA's mentioned in the detailed description of contact adhesive 12 set forth above. The protrusion's 26 tendency to rebound to its' undeformed height can cause the sheet 20 to lose some or all of its' adherence to the target surface 50, but when a pressure sensitive adhesive 30 is used between the adherent sheet 20 and the substrate 40, the PSA 30 serves to help maintain the protrusions 26 in a collapsed state due to the adherence of the adhesive layer 30 to the collapsed protrusion 26 as shown in FIG. 5. Similarly, when a presurre sensitive adhesive 30 is applied to the back face contours of protrusions 26 in an alternative embodiment shown of FIG. 6, the same advantageous effect will be realized. The substrate 40 may be made of a variety of materials currently used as wall coverings, including but not limited to flexible and partially non-flexible foils, fabric, plastic films, and papers.

FIG. 5 also shows protrusions 26 collapsed under a force as indicated by force (F), applied to back face 24 of film sheet 20. Once protrusions 26 collapse, non-adhesive region 28, preferably contact adhesive 12, is caused to adhere to contact surface 50. This adhesion can be permanent or temporary depending upon how many protrusions 26 were collapsed. For example, if only a minimal number of protrusions are collapsed, sheet 10 will temporarily bond to target surface 50 because only a small percentage of contact adhesive 12 is adhered to contact surface 50. This temporary adhesive state allows the user to evaluate the position of sheet material 10 upon target surface 50 for only a very short time period; and if it is not in a desired position, remove sheet material from target surface and reposition it upon the target surface 50. When the user has found the final position of the wallpaper, a compressive force is applied to entire substrate 40 substantially perpendicular to a plane of sheet 10, thus deforming film protrusions 26. This exposes the adhesive 12 to the target surface 50 and thus preferably provides a permanent adherence for sheet material 10. The substrate 40 is then the outermost layer and may contain a decorative pattern such as is found in wall coverings. This sheet material 10 may be combined as a kit with instructions for use, consisting of the following instructions:

(a) positioning sheet material 10 on target surface 50 with front face 22 in contact with surface 50, until sheet material 10 is in desired location upon target surface 50; and (b) applying a force (F) perpendicular to and across the substrate sufficient to collapse the collapsible protrusions 26, whereby the contact adhesive 12 comes in contact with the surface 50.

In an alternative embodiment, a low tack contact adhesive, including but not limited to low tack PSA's, can be applied to the protrusion "tips" or protrusion apex 27. This low tack PSA would provide enough tack to hold sheet 10 to target surface 50 temporarily, but protrusions 26 would still prevent target surface 50 from contacting adhesive, non-raised regions 28, preferably contact adhesive 12, which consists of a high tack adhesive. Again, once sheet material 10 is position (and repositioned) upon target surface 50, a perpendicular force (F) applied to entire back face 24 of film sheet 20 will collapse protrusions 26 and permanently bond sheet material 10 to target surface 50.

In the preferred embodiment, once the adherent sheet 20 has been selectively activated, it has a peel force of at least about 0.3 pounds per linear inch, preferably at least about 0.5 pounds per linear inch, most preferably a peel force from about 0.5 pounds per linear inch to about 0.9 pounds per linear inch. The term "peel force" is used herein to refer to the force (F) required to peel the adherent system, i.e., sheet10, from a contact surface 50, i.e., target surface 50, in a substantially perpendicular direction from target surface 50. The peel strength, i.e., peel force, of the adhesive is preferably measured by Pressure Sensitive Tape Council Method PSTC-1. A 12 inch (30.5 cm) long by 1 inch (2.5 cm) wide strip of film is rolled once against a smooth stainless steel surface at a rate of 12 inches (30.5 cm) per minute using a 4.9 pound (2.25 kg) roller and then tested as having an average adhesion value of greater than about 0.3 pounds per linear inch (pli).

When bonding substrate 40 to film sheet 20, substrate 40 will act as a gas barrier, entrapping the air in voided space 25 of protrusions 26, if certain precautions are not taken.

This entrapped air can be problem because the air, if not allowed to escape, can prevent protrusions 26 from completely collapsing. There are a variety of ways to approach solving this potential problem of air flow management. The term "air flow management" as used herein refers to the many different ways of providing a path or channel so that the air entrapped within voided space 25 can escaped as protrusions 26 are being collapsed. These air vent paths or channels can be at a macroscopic or microscopic level and either intentionally formed or naturally occurring within film sheet 20, substrate 40 or laminating adhesive 30, either singly or in combination. To incorporate the air vent channels in sheet material 10, film sheet 20, substrate 40 or laminating adhesive 30, either singly or in combination can be porous, permeable, perforated, discontinuous or aperatured.

The term "porous" is used herein to refer to the ability of a material to admit fluids, preferably gas, to pass through its pores or interstices. The term "permeable" is used herein to refer to the ability of material to admit fluids, preferably gas, to pass through its pores or interstices whether intentionally induced or naturally occurring within the material. The term "perforated" is used herein to refer to a plurality of holes punched in a material. The term "discontinuous" is used herein to refer to the intentional use or application of a material that is not a continuous layer of material such that the material does not form a barrier layer to the gas escaping voided space 25 of protrusions 26 when protrusions 26 are collapsed. The term "apertured" is used herein to refer to any hole, slit or opening of any size or shape intentionally formed within such materials. In a preferred embodiment depicted in FIG. 4, the laminating adhesive 30 and substrate 40 should be either porous, permeable, perforated, discontinuous, aperatured or some combination thereof, thereby permitting the protrusions 26 to collapse more completely by displacing any air trapped in the voided volume 25 of the protrusions 26 through the air vent channels within the laminating adhesive 30 and/or substrate 40. For example, one embodiment of the present invention includes both a substrtate 40 and laminating adhesive 30 that are either porous or permeable. In another embodiment, both substrtate 40 and laminating adhesive 30 are perforated under protrusions 26 such that entrapped air in void space 25 can escape through the perforated air vent channels.

Figure 6:
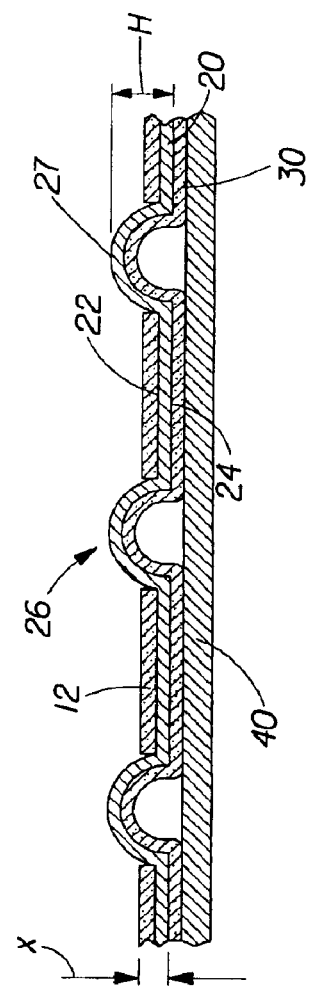
FIG. 6 is an alternative embodiment of a adherent sheet material of the present invention, wherein the lamating adhesive follows the contours of the protrusion along the back face of the film.
Figure 7:
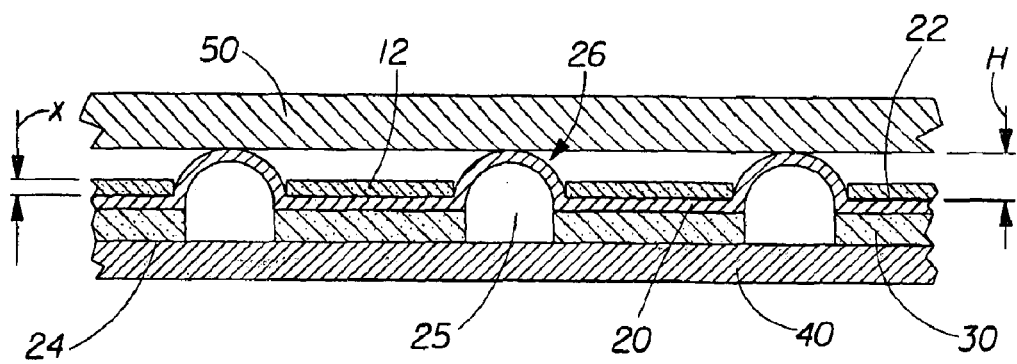
FIG. 7 is an alternative embodiment of a adherent sheet material of the present invention, wherein the laminating adhesive is discontinuous.

In an alternative embodiment depicted in FIG. 6, substrtate 40 is either porous, permeable, perforated, discontinuous, aperatured or some combination thereof and laminating adhesive 30 follows the contours of protrusions 26 along back face 24 of film sheet 20 forming non-adhesive regions under protrusions 26. This embodiment does not require adhesive 30 to be discontinuous or permeable to permit protrusions 26 to more completely collapse. In yet another embodiment of sheet material 10, laminating adhesive 30 may be discontinuous by microscopic channels imparted in it by the spray coating process. The laminating adhesive 30 may also be discontinuous by way of macroscopic channels formed by the periodic application of laminating adhesive 30 upon substrate 40 forming a non-continuous path as shown in FIG. 7.

In yet another embodiment of sheet material 10, film sheet 20 is porous, permeable, perforated, discontinuous or any combination thereof and substrate 40 can be gas impermeable or include any of the above mentioned properties to provide additional air vent channels. Other alternative embodiments which allow for trapped air to be displaced from the voided volume 25 of the protrusions 26 through film sheet 20 include, but are not limited to, intentionally permeable sheet material, such as found in paper sheets, breathable sheets (additive), etc.

Figure 8:
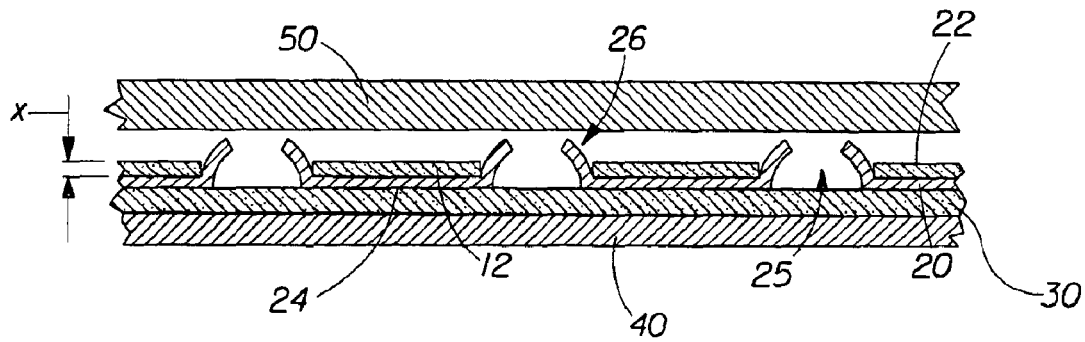
FIG. 8 is an alternative embodiment of a adherent sheet material of the present invention, wherein the film is apertured.

FIG. 8 shows another alternative embodiment wherein protrusions 26 are apertured on front face 22, as well as the back face 24, of the film sheet 20 forming an opening at protrusion apex 27. Having the protrusions 26 open on both the front face 24 and back face 24 allows for the air trapped in the voided volume 25 of the protrusions 26 to be displaced along a contact surface when compressed.

Figure 9:
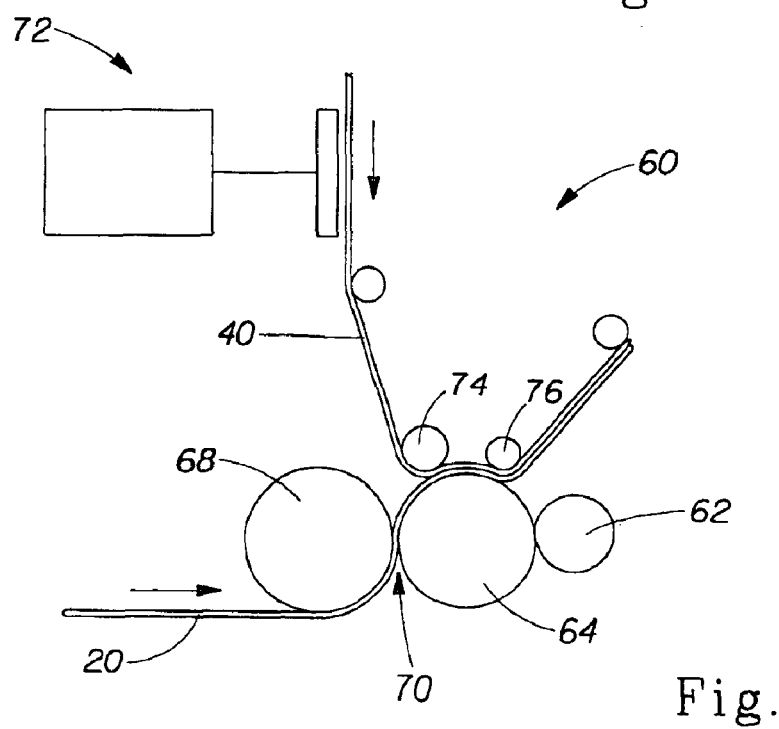
FIG. 9 is process flow chart of a method for making the composite sheet material of the present invention, disclosing a automated embossing process to form sheet material of the present invention.

A method of making is illustrated in FIG. 9. The film sheet 20 may be formed by vacuum thermoforming or embossing or other means as shown and described in commonly assigned, U.S. Pat. No. 5,662,758 issued to Hamiltion et al. on Sep. 2, 1997, and U.S. Pat. No. 5,871,607 issued to Hamilton et al. on Feb. 16, 1999, and commonly assigned, U.S. patent application Ser. No. 09/289,222, filed Apr. 9, 1999 in the name of McGuire et al. which are herein incorporated by reference. Embossing is the preferred method of making the adherent sheet material 10 and is set forth below.

Figure 10:
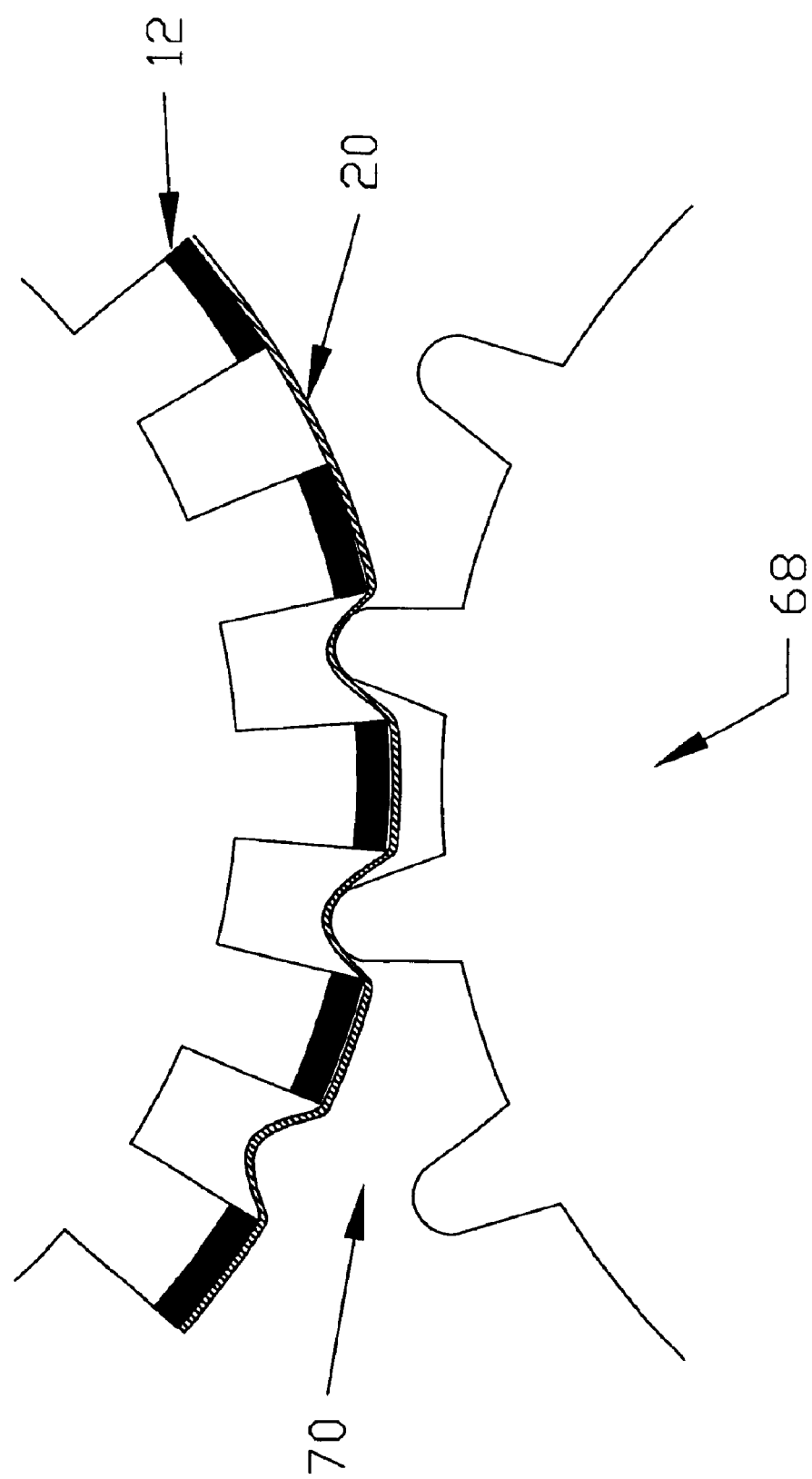
FIG. 10 is a is a side elevation view of the nip region of the method for making the composite sheet material of the present invention.

FIGS. 9–11 show an automated process for making sheet material 10, generally indicated as 60. A drum 64 (hereinafter referred to as "female embossing drum" 64) has an outermost diameter that has patterned depressions. This outermost diameter is treated to have a low surface energy, i.e., a release coating is applied, so that the adhesive 12 will not readily wet it, or in other words, the adhesive 12 will have a greater affinity to the film sheet 20 than the female embossing drum 64. This outermost diameter is then coated with the adhesive 12 by an adhesive deposition system 62 such that the adhesive 12 is only transferred to the outermost diameter of the female drum 64 and is not transferred into the patterned depressions. This adhesive deposition drum 62 is positioned upstream from the female embossing drum 64 and a matching drum 68 with matching patterned male drum pins (hereinafter referred to as "male embossing drum" 68). The male 20 embossing drum 68 is mated with the female embossing drum 64 such that each of the male drum pins on the male embossing drum 68 has a corresponding depression in the female embossing drum 64 into which it engages at a nip region 70.

Automated process 60 introduces a film sheet 20 into this nip region 70 whereby it is permanently, mechanically deformed by the matching set of embossing drums (64 and 68), and their corresponding male drum pins and female drum depressions as shown in FIG. 10. The deformation is such that film sheet 20 retains the three-dimensional shape of the male drum pins of the male embossing drum 68 even after film sheet 20 has left the nip region 70. The film sheet 20 may be preheated to aid in such permanent deformation by radiant heating, conductive heating, convective heating or other methods well known in the art.

At the nip region 70, in addition to being permanently mechanically deformed by the embossing drums, the film sheet 20 also comes in contact with the adhesive 12 that is coated only on the outermost diameter of the female embossing drum 64. Due to the precoating on the outermost diameter of the female drum 64, the adhesive adheres itself to the film sheet 20 in the spaces 28 between and around the film protrusions 26 that are formed through permanent mechanical deformation by the embossing drums. This results in a three-dimensional formed film sheet 20 with a layer of adhesive 12 surrounding embossed, film stand-off protrusions 26 that have a greater height H than the thickness of the adhesive X.

A method of bonding a film sheet 20 and a substrate 40 to each other is shown in FIGS. 9 and 11. While the formed film sheet 20 is still integrally connected with the female embossing drum 64, a substrate 40 is laid on the side of the film sheet 20 not in contact with the female embossing drum 64. Before contact with the film sheet 20, a laminating adhesive 30 is deposited on the substrate 40 by a substrate adhesive deposition system 72 by slot coating, or other methods well known in the art. While using a pressure sensitive laminating adhesive 30 is the preferred method to create the bond between the film and the substrate, other methods, such as heat sealing or ultra-sonic welding may also be used. After initial contact between the film sheet 20 and the substrate 40, or at the point of contact, the film sheet 20 and substrate 40 are joined by pressure from a pressure drum 74, in a direction perpendicular to the plane of the film sheet 20 at that point. Since the formed film sheet 20 is still integrally connected with the female embossing drum 64 when the film sheet 20 and substrate 40 are combined by the pressure drum 74, the film protrusions 26 are protected from deformation under the pressure of the pressure drum 74 by the patterned depressions in the female embossing drum 64. These patterned depressions effectively surround the film protrusions 26, thereby serving as a protective shell that prevents the pressure drum 74 from collapsing the film protrusions 26. The substrate 40 and film 20, which are now bonded together, are then stripped from the female embossing drum 64 by a stripping drum 76.

The protrusion size, shape and spacing, the film flexural modulus, and the film thickness determine the resistance of the protrusions to collapse over a unit area. It is desirable to provide a strength which is sufficient to withstand a pressure up to about 4.4 pounds per square inch without collapsing protrusions to where the adhesive contacts a target surface. This resistance to collapse enables the composite material to be wound onto a drum without damage for compact packaging purposes and to be handled and repositioned without premature adherence to a target surface. A composite material having the most preferred dimensions is believed to provide the desired strength. While particular embodiments of the present invention have been illustrated and described, it will be obvious to those skilled in the art that various changes and modifications may be made without departing from the spirit and scope of the invention, and it is intended to cover in the appended claims all such modifications that are within the scope of the invention.

What is claimed is:

1. An adherent sheet material comprising at least one adhesive, non-raised region protected from inadvertent adherence to a contact surface, said sheet material comprising:
    a film having a front face and back face, said front face having a plurality of collapsible, non-adhesive protrusions extending outwardly from said front face and said adhesive, non-raised region disposed between said protrusions, said protrusions having a number density from about 10 protrusions per square inch of said film to about 175 protrusions per square inch of film; and
    a permeable substrate layer bonded to said back face of said film with a laminating adhesive, said laminating adhesive having air vent channels.

2. A sheet material according to claim 1, further comprising a contact adhesive disposed upon said non-raised regions.

3. A sheet material according to claim 1, wherein a compressive force of at least about 0.1 psi is required to collapse said protrusions.

4. A sheet material according to claim 3, wherein a compressive force from about 0.5 pounds per square inch to about 15 pounds per square inch is required to collapse said protrusions.

5. A sheet material according to claim 1, wherein said density of protrusions is from about 50 protrusions per square inch of said film to about 150 protrusions per square/inch of film.

6. A sheet material according to claim 5, wherein said density of protrusions is from about 60 protrusions per square inch of said film to about 90 protrusions per square inch of film.

7. A sheet material according to claim 1, wherein said protrusions having a height from about 0.01 inches to about 0.04 inches.

8. A sheet material according to claim 7, wherein each said protrusion having a protrusion base surface area from about 0.0007 inches to about 0.008 square inches.

9. A sheet material according to claim 8, wherein said protrusions having a center-to-center distance from about 0.05 inches to about 0.15 inches.

10. A sheet material according to claim 9, wherein said protrusions are dome-shaped and have a base diameter from about 0.03 inches to about 0.1 inches.

11. A sheet material according to claim 1, wherein said film is high density polyethylene having a thickness from about 0.0003 inches to about 0.003 inches.

12. A sheet material according to claim 1, wherein said substrate layer is a member selected from the group consisting of flexible foil, fabric, plastic film and paper.

13. A sheet material according to claim 1, wherein said substrate further comprises air vent channels.

14. A sheet material according to claim 13, wherein said air venting channels further comprise at least one aperture disposed within a plurality of said protrusions.

15. A sheet material according to claim 1, wherein said substrate further comprises air vent channels.

16. An adherent sheet material comprising at least one adhesive, non-raised region protected from inadvertent adherence to a contact surface, said sheet material further comprising:
    a permeable film having a front face and back face, said front face having a plurality of collapsible, non-adhesive protrusions extending outwardly from said front face and said adhesive, non-raised region disposed between said protrusions, said film having a number density of protrusions from about 10 protrusions per square inch of said film to about 175 protrusions per square inch of said film;
    a substrate layer bonded to said back face with a laminating adhesive; and,
    wherein said adhesive non-raised region having a peel force of at least about 0.3 pounds per linear inch, and wherein said substrate under said protrusions is permeable and contains no laminating adhesive.

17. A sheet material according to claim 16, wherein said substrate layer is a member selected from the group consisting of flexible foil, fabric plastic film and paper.

18. A sheet material according to claim 16, wherein a compressive force of at least about 0.1 psi is required to collapse said protrusions.

19. A sheet material according to claim 18, wherein a compressive force from about 0.5 pounds per square inch to about 15 pounds per square inch is required to collapse said protrusions.

20. A sheet material according to claim 16, wherein said number density of protrusion is from about 50 protrusions per square inch of said film to about 150 protrusions per square inch of said film.

21. A sheet material according to claim 20, said number density of protrusion is from about 60 protrusions per square inch of said film to about 90 protrusions per square inch of said film.

22. A sheet material according to claim 16, wherein said protrusions having a height from about 0.01 inches to about 0.04 inches.

23. A sheet material according to claim 22, wherein each said protrusion having a protrusion base surface area from about 0.0007 square inches to about 0.008 square inches.

24. A sheet material according to claim 23, wherein said protrusions having a center-to-center distance from about 0.05 inches to about 0.15 inches.

25. A sheet material according to claim 24, wherein said protrusions are dome-shaped and have a base diameter from about 0.03 inches to about 0.1 inches.

26. A sheet material according to claim 16, wherein said film is high density polyethylene having a thickness from about 0.0003 inches to about 0.003 inches.

27. A sheet material according to claim 16, wherein said film having air venting channels.

28. A sheet material according to claim 27, wherein said air vent channel is at least one aperture disposed within a plurality of said protrusions.

29. A sheet material according to claim 16, wherein said laminating adhesive having air vent channels.

30. A sheet material according to claim 29, wherein said substrate having air vent channels.

31. A sheet material according to claim 16, wherein said substrate having air vent channels.

32. An adherent sheet material comprising a contact adhesive protected from inadvertent adherence to a contact surface, said sheet material comprising:
   a film having a front face and back face, said front face having a plurality of collapsible protrusions extending outwardly from said front face and non-raised regions disposed between said protrusions;
   a porous substrate layer bonded to said back face with a laminating adhesive, said laminating adhesive having air vent channels; and,
   said adhesive disposed upon said non-raised regions, said film having a number density of protrusions from about 50 protrusions per square inch of said film to about 150 protrusions per square inch of said film.

33. A sheet material according to claim 32, wherein said substrate layer is a member selected from the group consisting of flexible foil, fabric, plastic film and paper.

34. A sheet material according to claim 32, wherein a compressive force of at least about 0.1 psi is required to collapse said protrusions.

35. A sheet material according to claim 34, wherein a compressive force from about 0.5 pounds per square inch to about 15 pounds per square inch is required to collapse said protrusions.

36. A sheet material according to claim 32, said number density of protrusion is from about 60 protrusions per square inch of said film to about 90 protrusions per square inch of said film.

37. A sheet material according to claim 32, wherein said protrusions having a height from about 0.01 inches to about 0.04 inches.

38. A sheet material according to claim 37, wherein each said protrusion having a protrusion base surface area from about 0.0007 inches to about 0.008 square inches.

39. A sheet material according to claim 38, wherein said protrusions having a center-to-center distance from about 0.05 inches to about 0.15 inches.

40. A sheet material according to claim 39, wherein said protrusions are dome-shaped and have a base diameter from about 0.03 inches to about 0.1 inches.

41. A sheet material according to claim 32, wherein said film is high density polyethylene having a thickness from about 0.0003 inches to about 0.003 inches.

42. A sheet material according to claim 32, wherein said film having air vent channels.

43. A sheet material according to claim 42, wherein said air venting channel is at least one aperture disposed within a plurality of said protrusions.

44. A sheet material according to claim 32, wherein said substrate having air vent channels.

45. A sheet material according to claim 32, wherein said substrate under said protrusions is permeable and contains no laminating adhesive.

46. A sheet material according to claim 32, wherein said substrate having air vent channels.

* * * * *